Nov. 5, 1935.  C. D. GEER ET AL  2,019,902

COUNTER

Filed July 16, 1930

INVENTORS.
Charles D. Geer and
David L. Bacon,
BY Duell, Dunn & Anderson
ATTORNEYS.

Patented Nov. 5, 1935

2,019,902

UNITED STATES PATENT OFFICE 2,019,902

COUNTER

Charles D. Geer and David L. Bacon, New Haven, Conn., assignors to The Engineering and Research Corporation, New Haven, Conn., a corporation of Connecticut Application July 16, 1930, Serial No. 468,378

3 Claims. (Cl. 161—15)

This invention relates to a counting and registering device embodying functionally and structurally improved characteristics.

It is an object of the invention to provide an apparatus of this character which may be advantageously employed in numerous different associations but which will be of primary utility in connection with registering the flow of traffic.

In making studies of traffic conditions at street intersections or along highways, it is frequently necessary to know the total delay in some sort of a unit; for example, car minutes. This figure is desirable because if the total flow of traffic is known, the average delay per car can be determined. Heretofore no simple and convenient mechanism for performing this measurement has been provided. By the present invention, an apparatus is furnished by means of which anyone desiring to achieve such measurements will be able to accomplish the same in an extremely simple manner, the present invention registering for example the time each car has been waiting, and discriminating between necessary or unnecessary waiting time.

A still further object of the invention is that of providing a mechanism embodying a relatively simple and rugged construction embracing few parts which will cooperate efficiently over long periods of time with freedom from mechanical and electrical difficulties.

With these and further objects in mind, reference is had to the attached sheet of drawing illustrating one practical embodiment of the invention, and in which.

Figure 1:
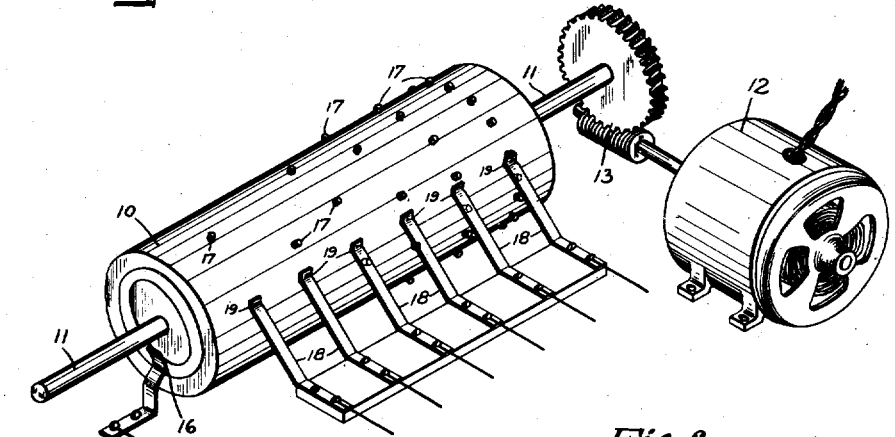
Fig. 1 is a perspective view of one unit of the mechanism.

Referring to Fig. 1, there is shown a drum 10 mounted on shaft 11. The shaft is driven by a motor 12 through gear 13, so that the drum revolves at uniform speed; for example, 10 R. P. M. The drum is of conducting material and is connected to one side of a source of current supply 14, through wire 15 and slip ring 16. Mounted on the surface of drum 10 are a series of conducting projecting pins 17. It will furthermore be noticed that pins 17 are arranged in a series of parallel circles. Mounted in front of each group of pins are contact springs 18. These are spaced from the surface of the drum 10 but have V-shaped projections 19 extending into the path of travel of the pins 17. Whenever such contact occurs, the springs 18 are energized through wire 15, ring 16, drum 10, pins 17 and projection 19.

Figure 2:
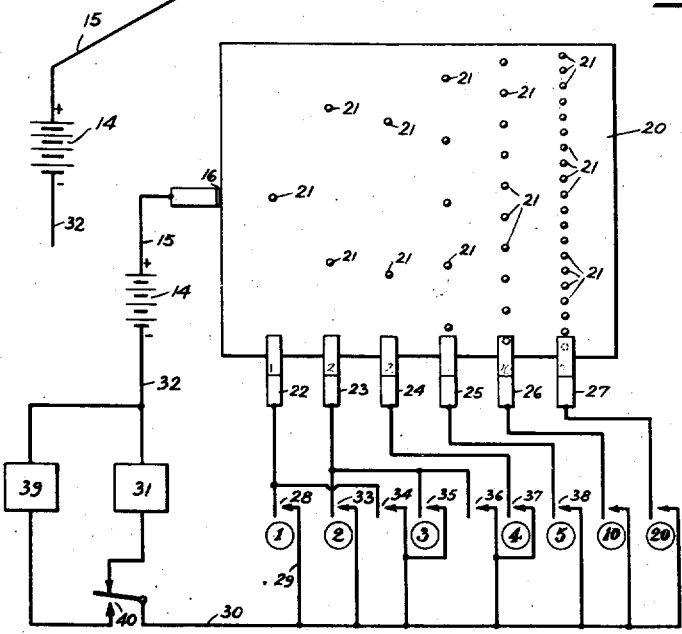
Fig. 2 is a diagrammatic view of such unit and showing the circuit employed.

Referring now to Fig. 2, there is shown at 20 the developed surface of the drum 10. The several small circles 21 represent the pins 17. 22 to 27 inclusive represent the several springs 18. It will be noticed in the embodiment illustrated that there is only one pin which makes contact with spring 22; two pins which make contact with spring 23; two that may make contact with spring 24; five that make contact with spring 25; ten that make contact with spring 26; and twenty that make contact with spring 27. It will furthermore be noticed that for a purpose hereinafter specified, the pins or spring arms are so placed that only one pin at a time can be making contact with the arm in its path. Assuming now that the drum is rotating, it will be appreciated that spring 22 is energized once per revolution; spring 23, twice per revolution; spring 25 five times per revolution; etc.

Figure 3:
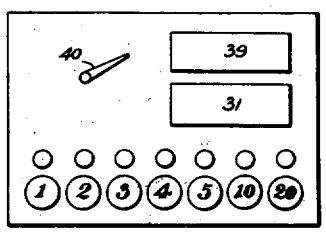
Fig. 3 is a side elevation of the apparatus.

The entire mechanism may be housed in a box as shown in Fig. 3. On the top surface of this box are a series of push buttons labelled (1) through (5) and, in addition, one push button labelled (10) and one labelled (20). These buttons make contact as shown by the wiring diagram in Fig. 2. If, for example, button 1 is pushed, contact 28 will be closed and thus once per revolution of the drum, current will flow from the current source 14 through wire 15, brush 16, drum 10, arm 22, contact 28, wire 29, wire 30, counter 31, and wire 32 back to the supply. Counter 31 is a so-called electrically operated counter and the number which is registered on its dial is increased by one every time the counter is energized. Thus, it is apparent, as soon as button 1 is held depressed, the registration of the counter will be increased by one for every revolution of the drum, or, since the drum revolves at a speed of 10 R. P. M., the registration will be increased by 10 per minute. Similarly, if button 2 is depressed, contact 33 is closed and counter 31 will be energized twice per revolution. If button 3 is depressed, contacts 34 and 35 are closed simultaneously and the impulses of both arms 22 and 23 are applied to the counter which will be, of course, three per revolution. This indicates the necessity of having the pins or arms spaced so that no two will make contact with their respective springs at the same time, because then only a single impulse would be registered. If button 4 is depressed, contacts 36 and 37 are closed and four impulses per revolution will be registered. If button 5 is depressed, contact 38 is closed and five impulses per revolution will be registered. The process is similar for the other buttons. In order to register, for example, 12, button 2 and button 10 are held depressed simultaneously. In this way, button 2 will register twice per revolution and button 10 ten times, giving a total of twelve.

In using the device, the operator would station himself in such a position that he would have a clear view of the intersection and would then watch approaching traffic. Assuming, for example, that the intersection is controlled by the so-called fixed-time light which gives right-of-way to one street for a certain period and then right-of-way to another street for a certain period, it is apparent that if a car approaches on a street not having right-of-way, it will be forced to stop. As soon as the car has stopped, the operator of the counter meter would push button 1 holding it depressed, and the device would begin to register tenths of car minutes until the waiting vehicle proceeds. If, in the meantime, however, a second vehicle has approached and is also forced to stop, the operator would release button 1 and depress button 2 and the units of waiting time would be registered twice as fast. Similarly, if a third car approaches, button 3 would be depressed, etc. The particular machine described would register a limited number of cars, but, of course, by providing additional buttons, this could be extended indefinitely. The waiting time would then register on counter 31.

It is sometimes desirable to distinguish between so-called necessary time and unnecessary waiting time. This would be accomplished by providing a second counter 39, and by providing a switch 40, so that either counter may be connected in circuit. Necessary waiting time occurs if vehicles are forced to wait because traffic is moving in the other street. Unnecessary waiting time occurs if vehicles are forced to wait even though there is no traffic in the other street. In this way, by simply moving switch 40 into the proper position, necessary waiting time may be registered on one of the counters, or unnecessary waiting time on the other.

Thus, among others, the several objects of the invention afore referred to have been achieved. It will moreover be understood that numerous changes in construction and rearrangements of the parts might be resorted to without departing from the spirit of the invention as defined by the claims.

Having described our invention, what we claim as new and desire to secure by Letters Patent is:

1. A counter comprising, in combination, an electrically operated indexable registering means, a rotatable drum, a timing motor driving said drum at a substantially constant pre-determined speed, rows of contact studs on the surface of said drum and arranged in parallel circles substantially perpendicular to the axis of said drum, said rows having various numbers of contact studs, contacts for engaging each row of contact studs on said drum, and an operating circuit for said registering means including means for selectively including one or more of said contacts in said operating circuit to cause operation of said registering means as said drum rotates.

2. A counter comprising, in combination, an electrically operated indexable register, a rotatable drum, a timing motor driving said drum, at a substantially constant pre-determined speed, groups of contact studs on the surface of said drum, each group arranged in a plane perpendicular to the axis of said drum and spaced axially from the other groups, all but two of said groups having different numbers of contact studs, contact means cooperating with each group of studs to contact said studs, and an electrical operating circuit for said register including means for selectively including one or more of said contact means in said operating circuit to cause operation of said register as said drum rotates.

3. A counter including in combination, registering means, a rotatable drum, a motor for driving said drum at a predetermined speed, groups of contact elements on the surface of said drum and arranged in rows in planes substantially perpendicular to the axis of said drum, certain of said rows including elements of a greater or lesser number than adjacent rows, means for connecting said drum contact elements to a source of electrical current supply, contact means for engaging each row of said contact elements, and an operating circuit for said registering means and including means for selectively including one or more of said contact means in said operating circuit to cause operation of said registering means as said drum rotates, said contact elements being so spaced in each of the several rows that only one element engages said contact means at a time as said drum rotates.

CHARLES D. GEER.
DAVID L. BACON.